United States Patent
Xiao

(10) Patent No.: US 11,767,015 B2
(45) Date of Patent: Sep. 26, 2023

(54) SYSTEM, VEHICLE, METHOD AND NON-TRANSITORY COMPUTER READABLE STORAGE MEDIUM FOR IMPROVING DRIVING SAFETY

(71) Applicant: Guangzhou Automobile Group Co., Ltd., Guangdong (CN)

(72) Inventor: Hai Xiao, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 272 days.

(21) Appl. No.: 17/123,155

(22) Filed: Dec. 16, 2020

(65) Prior Publication Data
US 2022/0185277 A1 Jun. 16, 2022

(51) Int. Cl.
*B60W 30/14* (2006.01)
*B60W 50/08* (2020.01)
*B62D 1/04* (2006.01)
*B60W 50/00* (2006.01)

(52) U.S. Cl.
CPC ...... *B60W 30/146* (2013.01); *B60W 50/0098* (2013.01); *B60W 50/082* (2013.01); *B62D 1/046* (2013.01); *B60W 2420/24* (2013.01)

(58) Field of Classification Search
CPC ........... B60W 30/146; B60W 50/0098; B60W 50/082; B60W 2420/24; B62D 1/046
See application file for complete search history.

(56) References Cited

U.S. PATENT DOCUMENTS

| | | | |
|---|---|---|---|
| 2010/0175499 A1* | 7/2010 | Thomas | B62D 1/04 74/552 |
| 2013/0185753 A1* | 7/2013 | Kliot | H04N 21/482 725/39 |
| 2014/0022070 A1* | 1/2014 | Golomb | B60Q 1/0082 340/475 |
| 2014/0224600 A1* | 8/2014 | Rosenbaum | B60T 7/085 188/158 |
| 2017/0349174 A1 | 12/2017 | Brandin | |
| 2020/0331512 A1* | 10/2020 | Kobata | B62D 1/06 |
| 2020/0398748 A1* | 12/2020 | Weston | B60K 20/04 |
| 2021/0094549 A1* | 4/2021 | Barone | F16H 61/688 |
| 2021/0095727 A1* | 4/2021 | Barone | F16D 48/06 |
| 2022/0185277 A1* | 6/2022 | Xiao | B60W 50/082 |

FOREIGN PATENT DOCUMENTS

CN 208069573 U 11/2018

* cited by examiner

*Primary Examiner* — Peter D Nolan
*Assistant Examiner* — Wae L Louie
(74) *Attorney, Agent, or Firm* — ScienBiziP, P.C.

(57) ABSTRACT

A system, vehicle, method and non-transitory computer readable storage medium for improving driving safety are provided. The system includes: a steering wheel; a paddle attached to the steering wheel; a pressure sensor, which is installed between the paddle and a contact point of the paddle to the steering wheel and is coupled to a control component, wherein the pressure sensor is configured to sense a pressure exerted on the pressure sensor by the paddle and send the sensed pressure to the control component; and the control component, which is configured to, in responsive to receiving the sensed pressure, determine a level of deceleration corresponding to the sensed pressure and send a deceleration command which instructs to decelerate, based on the determined level of deceleration, a vehicle on which the system for improving the driving safety is installed.

8 Claims, 4 Drawing Sheets

SYSTEM, VEHICLE, METHOD AND NON-TRANSITORY COMPUTER READABLE STORAGE MEDIUM FOR IMPROVING DRIVING SAFETY

TECHNICAL FIELD

The present disclosure relates to the improvement of driving safety, in particular to a system, vehicle, method and non-transitory computer readable storage medium for improving driving safety.

BACKGROUND

Advanced Driver Assistance Systems (ADAS) are electronic systems that assist drivers in driving and parking functions. Through a safe human-machine interface, ADAS increase car and road safety. ADAS systems use automated technology, such as sensors and cameras, to detect nearby obstacles or driver errors, and respond accordingly.

Among all kinds of features for the ADAS, an Adaptive Cruise Control (ACC) function dynamically adjusts the vehicle speed for a safe distance from vehicles ahead. Such feature eases drivers' burden such that the driver takes her or his foot off the accelerator pedal and has a more relaxed driving experience, especially during a long trip.

However, the use of the ACC function can increase risks when an unexpected event occurs due to more reaction time needed for ACC than that for manual driving. On the other hand, when a driver adapts to ACC and believes that ACC is safer, it is very likely that he or she is not prepared for a sudden braking situation. This causes both driving safety and user experience issues.

SUMMARY

The following presents a simplified summary in order to provide a basic understanding of some aspects of the present disclosure. This summary is not an extensive overview of the present disclosure. It is intended neither to identify key or critical element of the present disclosure. The following summary merely presents some concepts of the present disclosure in a simplified form as a prelude to the description below.

In accordance with an aspect of the present disclosure, a system for improving driving safety is provided. The system for improving driving safety includes: a steering wheel; a paddle attached to the steering wheel; a pressure sensor, which is installed between the paddle and a contact point of the paddle to the steering wheel and is coupled to a control component, wherein the pressure sensor is configured to sense a pressure exerted on the pressure sensor by the paddle and send the sensed pressure to the control component; and the control component, which is configured to, in responsive to receiving the sensed pressure, determine a level of deceleration corresponding to the sensed pressure and send a deceleration command which instructs to decelerate, based on the determined level of deceleration, a vehicle on which the system for improving the driving safety is installed.

In at least one exemplary embodiment, the paddle has a ring shaped body.

In at least one exemplary embodiment, a distance between the ring shaped body of the paddle and a ring-shaped body of the steering wheel is smaller than a preset distance.

In at least one exemplary embodiment, a pressure exerted on any part of the paddle is transferred to the pressure sensor.

In at least one exemplary embodiment, the level of deceleration increases with the increase of the sensed pressure; or, the level of deceleration increases with the increase of a pressure level within which the sensed pressure falls.

In at least one exemplary embodiment, the control component is configured to: look up in a correspondence table according to the sensed pressure to determine the level of deceleration corresponding to the sensed pressure, wherein the correspondence table stores correspondence between levels of deceleration and values of the sensed pressure, or between levels of deceleration and pressure levels within which the sensed pressure falls; or, calculate, based on a preset algorithm according to the sensed pressure, the level of deceleration corresponding to the sensed pressure or corresponding to a pressure level within which the sensed pressure falls.

In accordance with another aspect of the present disclosure, a vehicle is provided. The vehicle includes a system for improving driving safety and a speed control system. The system for improving driving safety includes: a steering wheel; a paddle attached to the steering wheel; a pressure sensor, which is installed between the paddle and a contact point of the paddle to the steering wheel and is coupled to a control component, wherein the pressure sensor is configured to sense a pressure exerted on the pressure sensor by the paddle and send the sensed pressure to the control component; and the control component, which is configured to, in responsive to receiving the sensed pressure, determine a level of deceleration corresponding to the sensed pressure and send a deceleration command to the speed control system, wherein the deceleration command indicates the determined level of deceleration. The speed control system is configured to, in responsive to receiving the deceleration command, decelerate the vehicle based on the determined level of deceleration.

In at least one exemplary embodiment, the paddle has a ring shaped body.

In at least one exemplary embodiment, a distance between the ring shaped body of the paddle and a ring-shaped body of the steering wheel is smaller than a preset distance.

In at least one exemplary embodiment, a pressure exerted on any part of the paddle is transferred to the pressure sensor.

In at least one exemplary embodiment, the level of deceleration increases with the increase of the sensed pressure; or, the level of deceleration increases with the increase of a pressure level within which the sensed pressure falls.

In at least one exemplary embodiment, the control component is configured to: look up in a correspondence table according to the sensed pressure to determine the level of deceleration corresponding to the sensed pressure, wherein the correspondence table stores correspondence between levels of deceleration and values of the sensed pressure, or between levels of deceleration and pressure levels within which the sensed pressure falls; or, calculate, based on a preset algorithm according to the sensed pressure, the level of deceleration corresponding to the sensed pressure or corresponding to a pressure level within which the sensed pressure falls.

In accordance with still another aspect of the present disclosure, a method for improving driving safety applied to a system including a steering wheel, a paddle attached to the steering wheel, and a pressure sensor installed between the paddle and a contact point of the paddle to the steering wheel is provided. The method includes: sensing, via the pressure sensor, a pressure exerted on the pressure sensor by the paddle; in responsive to sensing the pressure, determining a level of deceleration corresponding to the sensed pressure and sending a deceleration command which instructs to decelerate, based on the determined level of deceleration, a vehicle on which the system for improving the driving safety is installed.

In at least one exemplary embodiment, the level of deceleration increases with the increase of the sensed pressure; or, the level of deceleration increases with the increase of a pressure level within which the sensed pressure falls.

In at least one exemplary embodiment, determining a level of deceleration corresponding to the sensed pressure includes: looking up in a correspondence table according to the sensed pressure to determine the level of deceleration corresponding to the sensed pressure, wherein the correspondence table stores correspondence between levels of deceleration and values of the sensed pressure, or between levels of deceleration and pressure levels within which the sensed pressure falls; or, calculating, based on a preset algorithm according to the sensed pressure, the level of deceleration corresponding to the sensed pressure or corresponding to a pressure level within which the sensed pressure falls.

In accordance with still another aspect of the present disclosure, a non-transitory computer readable storage medium, in which a computer program is stored, is provided. The computer program, when being executed by the processor, performs the method in the above embodiment and exemplary embodiments.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure and not intended to form an improper limit to the present disclosure. In the accompanying drawings.

DETAILED DESCRIPTION OF THE EMBODIMENTS

In order to make those skilled in the art understand the solutions of the present disclosure more clearly, the technical solutions in the embodiments of the present disclosure are clearly and completely elaborated below in combination with the accompanying drawings. It is apparent that the described embodiments are only a part of the embodiments of the present disclosure but not all. Based on the embodiments of the present disclosure, all the other embodiments obtained by those of ordinary skill in the art on the premise of not contributing creative effort belong to the scope of protection of the present disclosure.

It is to be noted that the terms like "first" and "second" in the specification, the claims and the accompanying drawings of the present disclosure are used for differentiating the similar objects, but do not have to describe a specific order or a sequence. It should be understood that the objects may be exchanged under appropriate circumstances, so that the embodiments of the present disclosure described here may be implemented in an order different from that described or shown here. Moreover, the terms like "include" and "have" and any variation of them are intended to cover nonexclusive including; for example, the process, method, system, product or system including a series of steps or units do not have to be limited to those clearly listed steps or units, but may include other steps or units which are not clearly listed or inherent in these process, method, system, product or apparatus.

Figure 1:
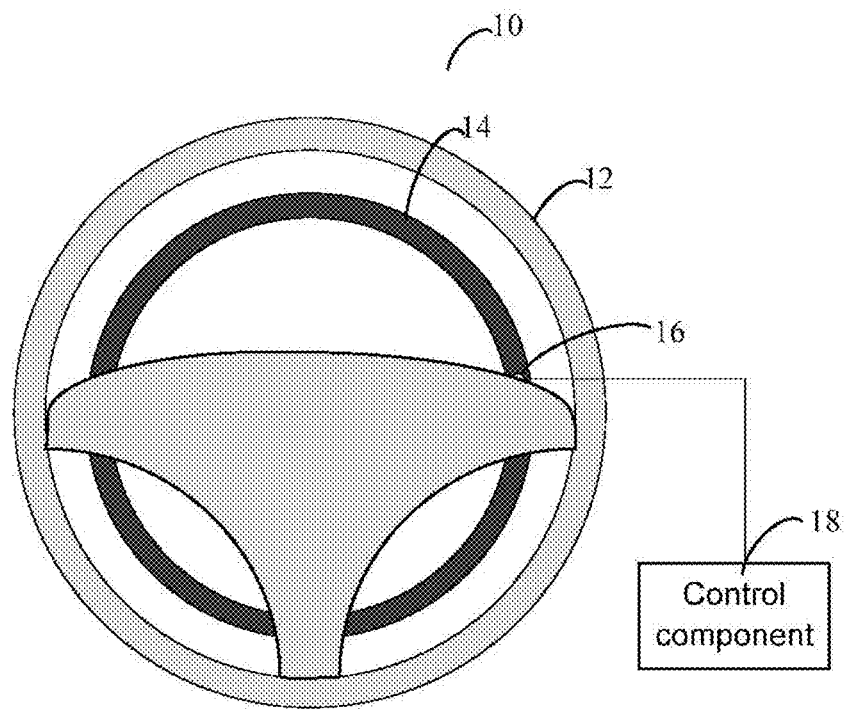
FIG. 1 shows the basic structure of a system for improving driving safety in the front view according to an embodiment of the present disclosure.

In accordance with an aspect of the present disclosure, a system for improving driving safety is provided. The system may be applied in any type of vehicle, for example, a vehicle with an ADAS (Advanced Driver Assistance System) ACC (Adaptive Cruise Control) feature. FIG. 1 shows the basic structure of a system for improving driving safety in the front view according to an embodiment of the present disclosure. As shown in FIG. 1, the system for improving driving safety includes:

a steering wheel 12;

a paddle 14 attached to the steering wheel 12;

a pressure sensor 16, which is installed between the paddle 14 and a contact point of the paddle 14 to the steering wheel 12 and is coupled to a control component 18, wherein the pressure sensor 16 is configured to sense a pressure exerted on the pressure sensor 16 by the paddle 14 and send the sensed pressure to the control component 18; and the control component 18, which is configured to, in responsive to receiving the sensed pressure, determine a level of deceleration corresponding to the sensed pressure and send a deceleration command which instructs to decelerate, based on the determined level of deceleration, a vehicle on which the system 10 for improving the driving safety is installed.

In the embodiments and the exemplary implementations of the present disclosure, the concept of deceleration includes the deceleration of speed so that the vehicle runs more slowly, or even stops. The effect of deceleration of the vehicle by the trigger of the paddle 14 is the same as the deceleration of the vehicle by the trigger of a braking pedal.

In at least one exemplary embodiment, as shown in FIG. 1, the paddle 14 has a ring shaped body. By using a paddle 14 with a ring shaped body, it can be ensured that the paddle 14 is reachable when the steering wheel 12 is turning. To further ensure that the driver can reach the paddle 14 conveniently whenever he needs to decelerate or stop the vehicle, especially when there is an emergency, a distance between the ring shaped body of the paddle 14 and a ring-shaped body of the steering wheel 12 is set to be smaller than a preset distance. In this way, when holding the steering wheel 12, the fingers of the driver can conveniently reach the paddle 14 to trigger deceleration of the vehicle.

Figure 2:
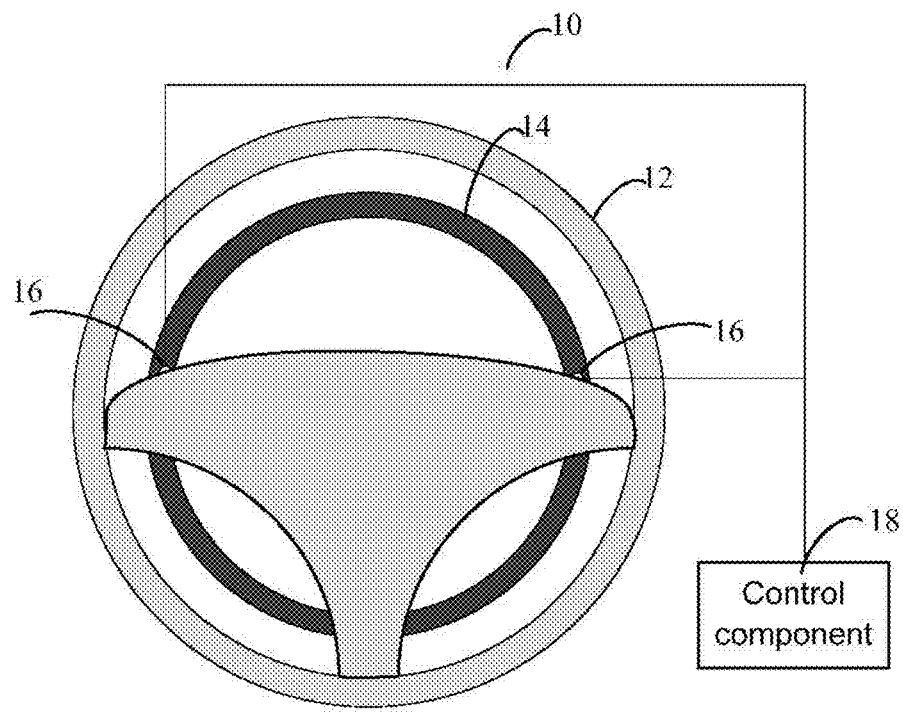
FIG. 2 shows the structure of a system for improving driving safety with two pressure sensors 16 according to an exemplary embodiment of the present disclosure.

In order to ensure that the pressing operation on any part of the paddle 14 can effectively trigger the deceleration of the vehicle, in at least one exemplary embodiment, a pressure exerted on any part of the paddle 14 is transferred to the pressure sensor 16. This object can be achieved by, for example, setting two or more pressure sensors 16, as shown in FIG. 2, which shows the structure of a system for improving driving safety with two pressure sensors 16 according to an exemplary embodiment of the present disclosure. Those skilled in the art should be able to understand that more than two pressure sensors 16 may be provided, to further improve the sensibility of any pressure exerted on the paddle 14.

In at least one exemplary embodiment, the level of deceleration increases with the increase of the sensed pressure; or, the level of deceleration increases with the increase of a pressure level within which the sensed pressure falls. That is, the level of deceleration can change with the change of the sensed pressure, and can also change with the change of the level of pressure within with the sensed pressure falls.

In at least one exemplary embodiment, the control component 18 may be configured to: look up in a correspondence table according to the sensed pressure to determine the level of deceleration corresponding to the sensed pressure, wherein the correspondence table stores correspondence between levels of deceleration and values of the sensed pressure, or between levels of deceleration and pressure levels within which the sensed pressure falls; or, calculate, based on a preset algorithm according to the sensed pressure, the level of deceleration corresponding to the sensed pressure or corresponding to a pressure level within which the sensed pressure falls.

Figure 3:
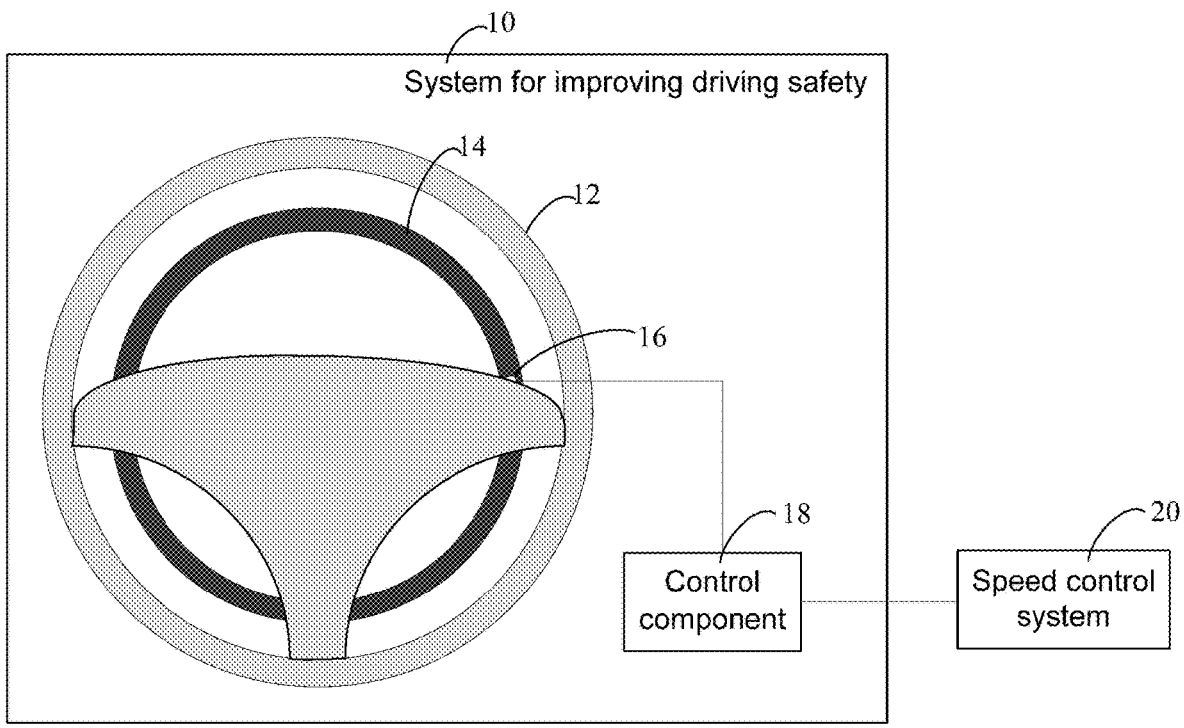
FIG. 3 shows the schematic structure of a vehicle (non-relevant components of the vehicle omitted) according to an embodiment of the present disclosure.

In accordance with another aspect of the present disclosure, a vehicle is provided. The vehicle may be any type of vehicle, for example, a vehicle with an ADAS (Advanced Driver Assistance System) ACC (Adaptive Cruise Control) feature. FIG. 3 shows the schematic structure of a vehicle (non-relevant components of the vehicle omitted) according to an embodiment of the present disclosure. The vehicle includes a system 10 for improving driving safety and a speed control system 20.

The system 10 for improving driving safety includes:

a steering wheel 12;

a paddle 14 attached to the steering wheel 12;

a pressure sensor 16, which is installed between the paddle 14 and a contact point of the paddle 14 to the steering wheel 12 and is coupled to a control component 18, wherein the pressure sensor 16 is configured to sense a pressure exerted on the pressure sensor 16 by the paddle 14 and send the sensed pressure to the control component 18; and the control component 18, which is configured to, in responsive to receiving the sensed pressure, determine a level of deceleration corresponding to the sensed pressure and send a deceleration command to the speed control system 20, wherein the deceleration command indicates the determined level of deceleration.

The speed control system 20 is configured to, in responsive to receiving the deceleration command, decelerate the vehicle based on the determined level of deceleration.

In the embodiments and the exemplary implementations of the present disclosure, the concept of deceleration includes the deceleration of speed so that the vehicle runs more slowly, or even stops. The effect of deceleration of the vehicle by the trigger of the paddle 14 is the same as the deceleration of the vehicle by the trigger of a braking pedal.

In at least one exemplary embodiment, as shown in FIG. 3, the paddle 14 has a ring shaped body. By using a paddle 14 with a ring shaped body, it can be ensured that the paddle 14 is reachable when the steering wheel 12 is turning. To further ensure that the driver can reach the paddle 14 conveniently whenever he needs to decelerate or stop the vehicle, especially when there is an emergency, a distance between the ring shaped body of the paddle 14 and a ring-shaped body of the steering wheel 12 is set to be smaller than a preset distance. In this way, when holding the steering wheel 12, the fingers of the driver can conveniently reach the paddle 14 to trigger deceleration of the vehicle.

Figure 4:
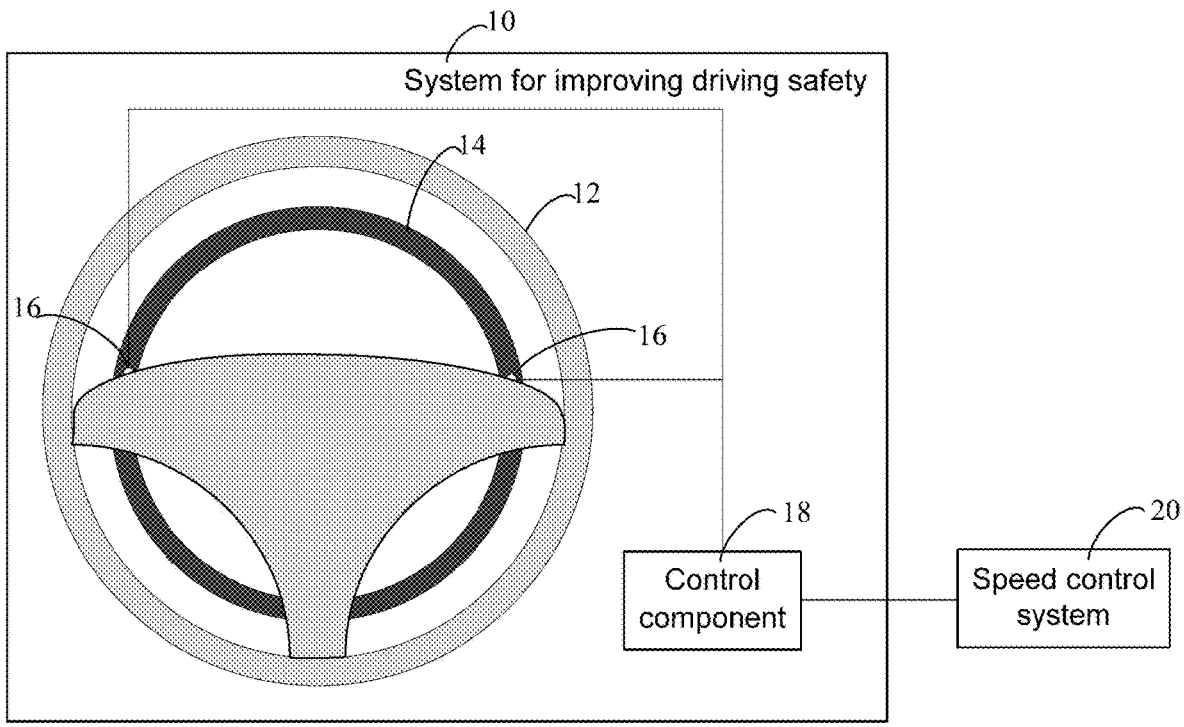
FIG. 4 which shows the structure of a vehicle (non-relevant components of the vehicle omitted) with two pressure sensors 16 according to an exemplary embodiment of the present disclosure.

In order to ensure that the pressing operation on any part of the paddle 14 can effectively trigger the deceleration of the vehicle, in at least one exemplary embodiment, a pressure exerted on any part of the paddle 14 is transferred to the pressure sensor 16. This object can be achieved by, for example, setting two or more pressure sensors 16, as shown in FIG. 4 which shows the schematic structure of a vehicle (non-relevant components of the vehicle omitted) with two pressure sensors 16 according to an exemplary embodiment of the present disclosure. Those skilled in the art should be able to understand that more than two pressure sensors 16 may be provided, to further improve the sensibility of any pressure exerted on the paddle 14.

In at least one exemplary embodiment, the level of deceleration increases with the increase of the sensed pressure; or, the level of deceleration increases with the increase of a pressure level within which the sensed pressure falls. That is, the level of deceleration can change with the change of the sensed pressure, and can also change with the change of the level of pressure within with the sensed pressure falls.

In at least one exemplary embodiment, the control component 18 may be configured to: look up in a correspondence table according to the sensed pressure to determine the level of deceleration corresponding to the sensed pressure, wherein the correspondence table stores correspondence between levels of deceleration and values of the sensed pressure, or between levels of deceleration and pressure levels within which the sensed pressure falls; or, calculate, based on a preset algorithm according to the sensed pressure, the level of deceleration corresponding to the sensed pressure or corresponding to a pressure level within which the sensed pressure falls.

Figure 5:
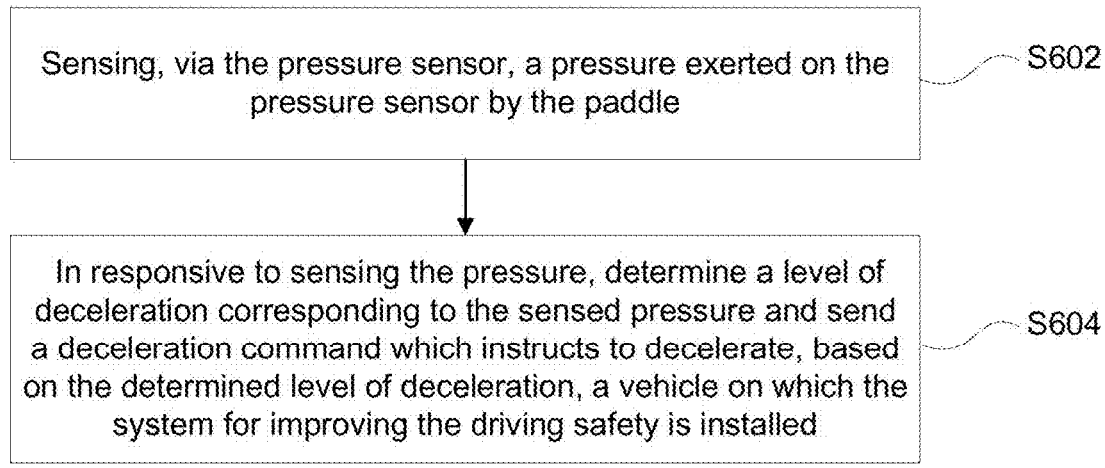
FIG. 5 shows the flowchart of a method for improving driving safety according to an embodiment of the present disclosure.

In accordance with still another aspect of the present disclosure, a method for improving driving safety applied to a system including a steering wheel, a paddle attached to the steering wheel, and a pressure sensor installed between the paddle and a contact point of the paddle to the steering wheel is provided. The method may be applied in any type of vehicle, for example, a vehicle with an ADAS (Advanced Driver Assistance System) ACC (Adaptive Cruise Control) feature. FIG. 5 shows the flowchart of a method for improving driving safety according to an embodiment of the present disclosure. The method includes operations S602 to S604, which will be described below in detail.

In operation S602, a pressure exerted on the pressure sensor by the paddle is sensed via the pressure sensor.

In operation S604, in responsive to sensing the pressure, a level of deceleration corresponding to the sensed pressure is determined and a deceleration command which instructs to decelerate, based on the determined level of deceleration, a vehicle on which the system for improving the driving safety is installed is sent, e.g., to a speed control system of the vehicle.

In at least one exemplary embodiment, the level of deceleration increases with the increase of the sensed pressure; or, the level of deceleration increases with the increase of a pressure level within which the sensed pressure falls.

That is, the level of deceleration can change with the change of the sensed pressure, and can also change with the change of the level of pressure within with the sensed pressure falls.

In at least one exemplary embodiment, the determining a level of deceleration corresponding to the sensed pressure in the operation S604 includes one of:

looking up in a correspondence table according to the sensed pressure to determine the level of deceleration corresponding to the sensed pressure, wherein the correspondence table stores correspondence between levels of deceleration and values of the sensed pressure, or between levels of deceleration and pressure levels within which the sensed pressure falls; or, calculating, based on a preset algorithm according to the sensed pressure, the level of deceleration corresponding to the sensed pressure or corresponding to a pressure level within which the sensed pressure falls.

It is to be noted that for the sake of simple description, each aforementioned embodiment of the method is described as a series of action combinations. But those skilled in the art should know that the present disclosure is not limited to a sequence of the described actions, it is because some steps may be performed in other sequences or simultaneously according to the present disclosure. Besides, those skilled in the art should also know that all the embodiments described in the specification are preferred embodiments, and the actions and modules involved may not be necessary.

In accordance with still another aspect of the present disclosure, a non-transitory computer readable storage medium, in which a computer program is stored, is provided. The computer program, when being executed by the processor, performs the method in the above embodiment and exemplary embodiments.

According to still another embodiment of the present disclosure, a detailed method for improving driving safety is described.

The new mechanism in the present embodiment utilizes a metal paddle attached to steering wheel for immediate and convenient brake or deceleration. Any part of the paddle can be activated by driver's hands through linear control unit. Functionally, this is equivalent to the brake pedal controlled by driver's foot. To ensure the paddle reachable when steering wheel is turning, the paddle is made into a ring.

Figure 6:
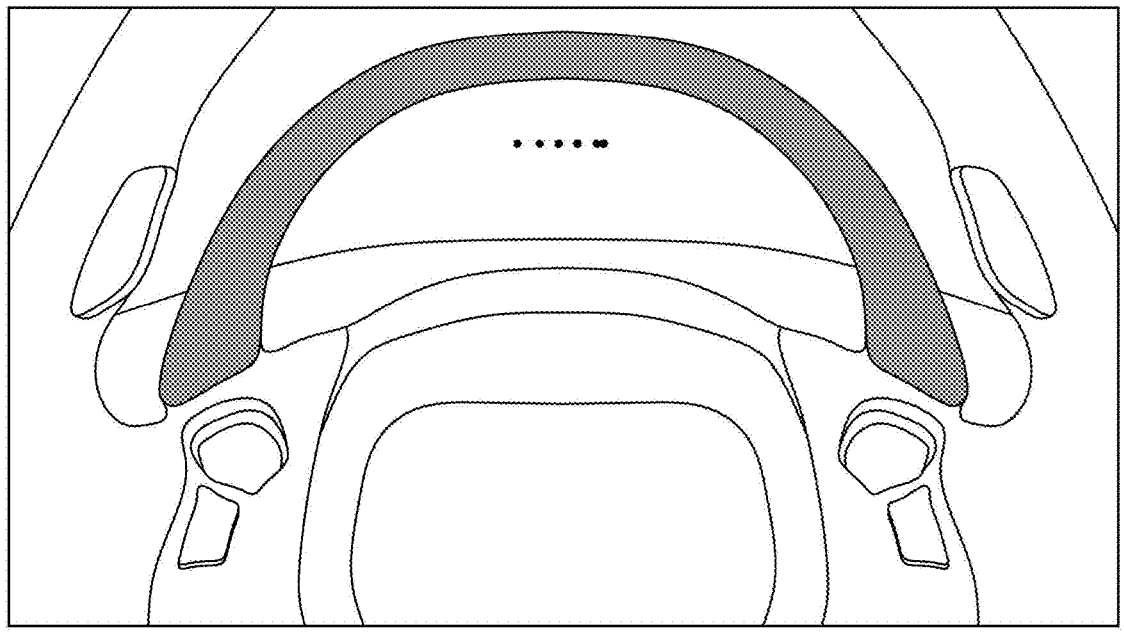
FIG. 6 shows the structure of the paddle and its connection with the steering wheel according to an exemplary embodiment of the present disclosure.

FIG. 6 is the structure of the paddle and its connection with the steering wheel according to an exemplary embodiment of the present disclosure. As shown in FIG. 6, the paddle is similar to the metal paddle shifters, except that the paddle is closed and forms a ring (only a half of the ring is shown in FIG. 6). A pressure sensor is installed between the paddle and the contact point to the steering wheel. The driver can apply different pressure levels to the paddle, just as the foot puts different pressure on the brake pedal. The control system can apply different levels of deceleration on the vehicle based upon the pressure received on the contact point.

Figure 7:
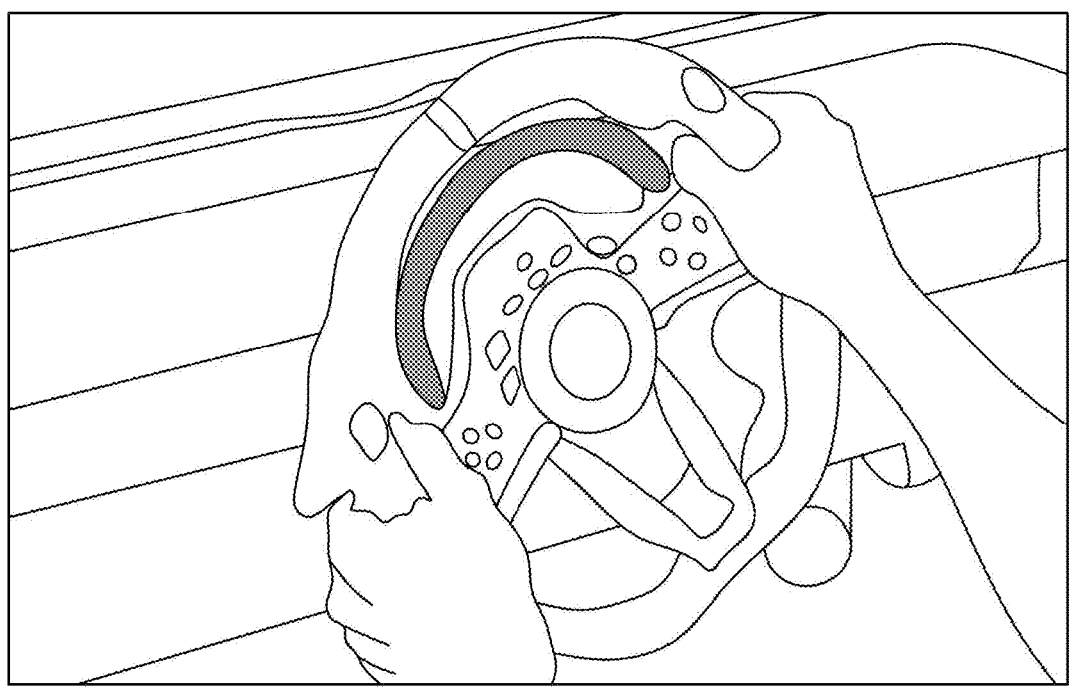
FIG. 7 shows the schematic diagram for the released state of the paddle during a practical driving scenario according to an exemplary embodiment of the present disclosure.
Figure 8:
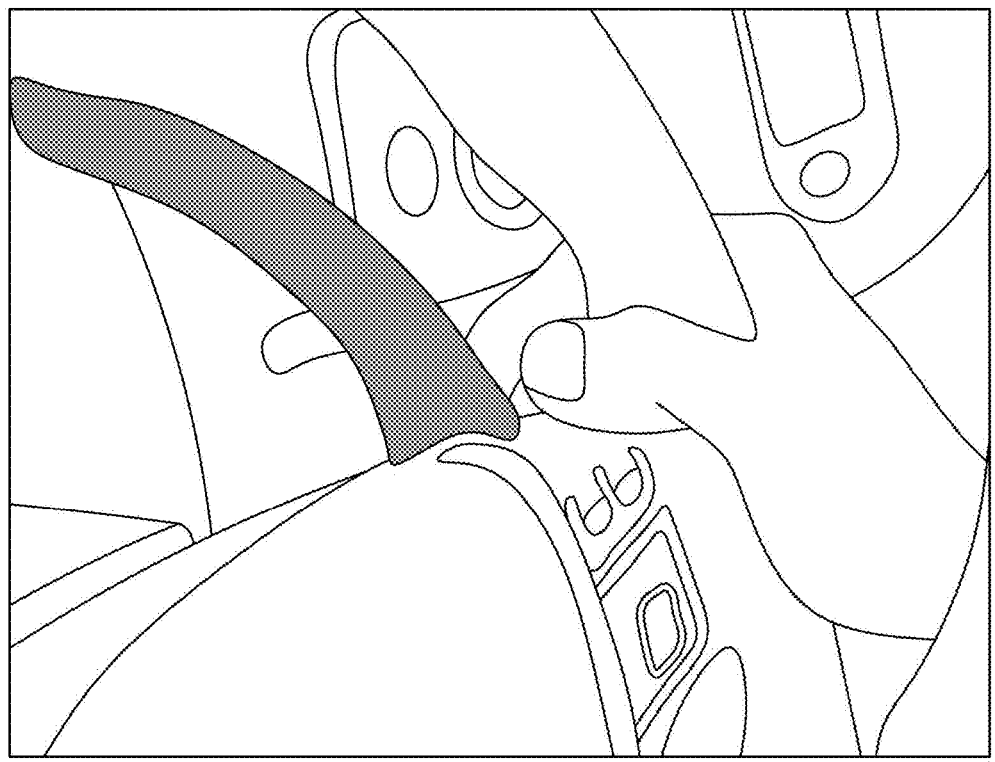
FIG. 8 shows the schematic diagram for the applied state of the paddle during a practical driving scenario according to an exemplary embodiment of the present disclosure.

FIG. 7 is the schematic diagram for the released state of the paddle during a practical driving scenario according to an exemplary embodiment of the present disclosure. FIG. 8 is the schematic diagram for the applied state of the paddle during a practical driving scenario according to an exemplary embodiment of the present disclosure. As shown in FIGS. 8 and 9, the paddle will not exert any pressure on the pressure sensor when the hand is not pressing on the paddle, and will exert a pressure on the pressure sensor when the hand presses on the paddle. Based on different pressure received by the pressure sensor at the contact point, different levels of deceleration can be applied on the vehicle.

The apparatus can be easily made and has ASIL-D safety level. In ACC mode, the driver always keeps his or her hands on the steering wheel and has the immediate access to the paddle without any sacrifice of foot relax. Therefore, inclusion of this feature into the ADAS will improve driving safety and user experience in ACC mode. The concept in this embodiment can improve driving safety and user experience for ADAS (Advanced Driver Assistance System) ACC (Adaptive Cruise Control) feature.

The above is only the preferred embodiments of the present disclosure; it should be indicated that, on the premise of not departing from the principles of the present disclosure, those of ordinary skill in the art may also make a number of improvements and supplements, and these improvements and supplements should fall within the scope of protection of the present disclosure.

What is claimed is:

1. A system for improving driving safety, comprising:
a steering wheel;
a paddle attached to the steering wheel, the paddle having a ring-shaped body, wherein a distance between the ring-shaped body of the paddle and a ring-shaped body of the steering wheel is smaller than a preset distance;
a pressure sensor, which is installed between the paddle and a contact point of the paddle to the steering wheel and is coupled to a control component, wherein the pressure sensor is configured to sense a pressure exerted on the pressure sensor by the paddle and send the sensed pressure to the control component; and
the control component, which is configured to, in responsive to receiving the sensed pressure, determine a level of deceleration corresponding to the sensed pressure and send a deceleration command which instructs to decelerate, based on the determined level of deceleration, a vehicle on which the system for improving the driving safety is installed.

2. The system as claimed in claim 1, wherein a pressure exerted on any part of the paddle is transferred to the pressure sensor.

3. The system as claimed in claim 2, wherein
the level of deceleration increases with an increase of the sensed pressure; or,
the level of deceleration increases with an increase of a pressure level within which the sensed pressure falls.

4. The system as claimed in claim 3, wherein the control component is configured to:
look up in a correspondence table according to the sensed pressure to determine the level of deceleration corresponding to the sensed pressure, wherein the correspondence table stores correspondence between levels of deceleration and values of the sensed pressure, or between levels of deceleration and pressure levels within which the sensed pressure falls; or,
calculate, based on a preset algorithm according to the sensed pressure, the level of deceleration corresponding to the sensed pressure or corresponding to a pressure level within which the sensed pressure falls.

5. A vehicle, comprising a system for improving driving safety and a speed control system, wherein the system for improving driving safety comprises:
a steering wheel;
a paddle attached to the steering wheel, the paddle having a ring-shaped body, wherein a distance between the ring-shaped body of the paddle and a ring-shaped body of the steering wheel is smaller than a preset distance;

a pressure sensor, which is installed between the paddle and a contact point of the paddle to the steering wheel and is coupled to a control component, wherein the pressure sensor is configured to sense a pressure exerted on the pressure sensor by the paddle and send the sensed pressure to the control component; and the control component, which is configured to, in responsive to receiving the sensed pressure, determine a level of deceleration corresponding to the sensed pressure and send a deceleration command to the speed control system, wherein the deceleration command indicates the determined level of deceleration;

the speed control system is configured to, in responsive to receiving the deceleration command, decelerate the vehicle based on the determined level of deceleration.

6. The vehicle as claimed in claim 5, wherein a pressure exerted on any part of the paddle is transferred to the pressure sensor.

7. The vehicle as claimed in claim 6, wherein the level of deceleration increases with an increase of the sensed pressure; or, the level of deceleration increases with an increase of a pressure level within which the sensed pressure falls.

8. The vehicle as claimed in claim 7, wherein the control component is configured to:

look up in a correspondence table according to the sensed pressure to determine the level of deceleration corresponding to the sensed pressure, wherein the correspondence table stores correspondence between levels of deceleration and values of the sensed pressure, or between levels of deceleration and pressure levels within which the sensed pressure falls; or, calculate, based on a preset algorithm according to the sensed pressure, the level of deceleration corresponding to the sensed pressure or corresponding to a pressure level within which the sensed pressure falls.

* * * * *